United States Patent
Shah et al.

(10) Patent No.: US 11,314,500 B2
(45) Date of Patent: Apr. 26, 2022

(54) SYSTEM AND METHOD FOR MODULARIZING UPDATE ENVIRONMENT IN LIFE CYCLE MANAGER

(71) Applicant: Nutanix, Inc., San Jose, CA (US)

(72) Inventors: Alay Vyomeshbhai Shah, San Jose, CA (US); Kumar Sidhartha, Bangalore (IN); Manish Sharma, Bangalore (IN); Sarabjit Singh Saini, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 16/942,540

(22) Filed: Jul. 29, 2020

(65) Prior Publication Data

US 2022/0012036 A1   Jan. 13, 2022

Related U.S. Application Data

(60) Provisional application No. 63/049,978, filed on Jul. 9, 2020.

(51) Int. Cl.
*G06F 8/65* (2018.01)
*G06F 8/61* (2018.01)
(Continued)

(52) U.S. Cl.
CPC ............ *G06F 8/65* (2013.01); *G06F 8/61* (2013.01); *G06F 9/4401* (2013.01); *G06F 9/45558* (2013.01); *G06F 2009/45595* (2013.01)

(58) Field of Classification Search
CPC . G06F 8/61; G06F 8/65; G06F 9/4401; G06F 9/45558; G06F 2009/45595
(Continued)

(56) References Cited

U.S. PATENT DOCUMENTS 8,543,916 B2   9/2013   Anderson et al.
8,549,518 B1   10/2013   Aron et al.
(Continued)

FOREIGN PATENT DOCUMENTS

EP           3 317 762        5/2018
WO      WO-2017/004269        1/2017

OTHER PUBLICATIONS

Cano, Ignacio, et al. "Curator: Self-Managing Storage for Enterprise Clusters" (Mar. 27, 2017), from https://www.usenix.org/conference/nsdi17/.
(Continued)

*Primary Examiner* — Wei Y Zhen
*Assistant Examiner* — Mohammed N Huda
(74) *Attorney, Agent, or Firm* — Foley & Lardner LLP (57) ABSTRACT

A system and method for updating a component of a virtual computing system in a hyperconverged system includes installing, by a processor executing computer-readable instructions stored on a memory of a lifecycle manager of the virtual computing system, a software package on a node of the virtual computing system for updating the component of the virtual computing system, and booting, by the processor, the component into an update environment based on the software package. The software package decouples a dependency of the lifecycle manager on the update environment. The system and method also include updating, by the processor, the component in the update environment and booting, by the processor, the component out of the update environment into an operating environment upon completion of the update of the component.

28 Claims, 3 Drawing Sheets

(51) Int. Cl.
  *G06F 9/4401* (2018.01)
  *G06F 9/455* (2018.01)
(58) Field of Classification Search
  USPC ........................................................ 717/168
  See application file for complete search history.

(56) References Cited

U.S. PATENT DOCUMENTS

| | | | |
|---|---|---|---|
| 8,555,273 | B1 | 10/2013 | Chia et al. |
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,063,818 | B1 | 6/2015 | Risbood et al. |
| 9,069,708 | B2 | 6/2015 | Gill et al. |
| 9,323,641 | B2 | 4/2016 | Beasley |
| 9,336,132 | B1 | 5/2016 | Aron et al. |
| 9,652,265 | B1 | 5/2017 | Narayanasamy et al. |
| 9,772,866 | B1 | 9/2017 | Aron et al. |
| 10,416,986 | B2 | 9/2019 | Mukhopadhyay et al. |
| 10,642,603 | B2 | 5/2020 | Olderdissen et al. |
| 10,838,776 | B2 | 11/2020 | Mahajan et al. |
| 2004/0107417 | A1 | 6/2004 | Chia et al. |
| 2006/0143600 | A1 | 6/2006 | Cottrell et al. |
| 2013/0074061 | A1 | 3/2013 | Averbuch et al. |
| 2015/0212808 | A1 | 7/2015 | Mandava |
| 2015/0365437 | A1* | 12/2015 | Bell, Jr. et al. ............ G06F 8/65 726/1 |
| 2016/0057014 | A1* | 2/2016 | Thakkar et al. .... G06F 9/45558 709/223 |
| 2016/0350671 | A1 | 12/2016 | Morris et al. |
| 2017/0322815 | A1* | 11/2017 | Buswell .............. G06F 9/45558 |
| 2019/0026140 | A1 | 1/2019 | Mahajan et al. |
| 2019/0026141 | A1 | 1/2019 | Mahajan et al. |
| 2019/0026321 | A1 | 1/2019 | Mukhopadhyay et al. |
| 2019/0220271 | A1 | 7/2019 | Olderdissen et al. |
| 2019/0294463 | A1 | 9/2019 | Mukhopadhyay et al. |
| 2019/0342375 | A1 | 11/2019 | Stefanov et al. |
| 2020/0073648 | A1* | 3/2020 | Ambre et al. ............ G06F 8/65 |
| 2020/0097279 | A1 | 3/2020 | Mukhopadhyay et al. |
| 2020/0201664 | A1 | 6/2020 | Panse et al. |
| 2020/0201665 | A1 | 6/2020 | Panse et al. |
| 2020/0228547 | A1 | 7/2020 | Kottapalli et al. |

OTHER PUBLICATIONS

Ifor "LifeCycle Manager" (2020) M3 Core 13.4 Installation Guides IBM i, from https://docs.infor.com/help_m3_coreit_13.4/index.jsp?topic=%2Fcom.lawson.help.installa%2Fcom.infor.help.m3coreipg_ibmi_13.4.0%2Fxdv1493403335110.html.

Jubran, "Life Cycle Management (LCM)" (Apr. 2020) Nutanix NEXT Community Edition, from https://next.nutanix.com/how-it-works-22/life-cycle-management-lcm-37352.

Nutanix "AOS 5.0 New Feature: Life Cycle Management" (Jul. 2017) Nutanix NEXT Community Edition, from https://next.nutanix.com/blog-40/aos-5-0-new-feature-life-cycle-management-17322.

Nutanix "LCM Series | List of pre-checks before the upgrade" (Dec. 2019) Nutanix NEXT Community Edition, from https://next.nutanix.com/prism-infrastructure-management-26/lcm-series-list-of-pre-checks-before-the-upgrade-33730.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

VMware Docs "About vSphere Lifecycle Manager" (May 8, 2020) VMware vSphere Docs, from https://docs.vmware.com/en/VMware-vSphere/7.0/com.vmware.vsphere.lifecycle-manager.doc/GUID-74295A37-E8BB-4EB9-BFBA-47B78F0C570D.html.

VMware Inc. "VMware vRealize Suite Lifecycle Manager" (2020) VMWare Datasheet, from https://www.vmware.com/content/dam/digitalmarketing/vmware/en/pdf/products/vmware-vRealize-Suit-Lifecycle-Manager-8.0-Datasheet.pdf.

Nutanix, "Cloud Infrastructure Software and Firmware Upgrades" 2020, Nutanix, https://www.nutanix.com/products/life-cycle-manager.

Nutanix, "Nutanix Lifecycle Management (LCM)" 2020, Nutanix, https://www.nutanix.com/content/dam/nutanix/resources/datasheets/ds-lcm.pdf.

Scikit Learn, "sklearn.neural_network.MLPClassifier" 2017, scikit-learn developers, https://scikit-learn.org/stable/modules/generated/sklearn.neural_network.MLPClassifier.html.

* cited by examiner

SYSTEM AND METHOD FOR MODULARIZING UPDATE ENVIRONMENT IN LIFE CYCLE MANAGER

CROSS-REFERENCE TO RELATED APPLICATION

This application claims priority from U.S. Provisional Application No. 63/049,978, filed on Jul. 9, 2020, the entirety of which is incorporated by reference herein.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with some aspects of the present disclosure, a method is disclosed. The method includes installing, by a processor executing computer-readable instructions stored on a memory of a lifecycle manager, a software package on a node of a virtual computing system in a hyperconverged system for updating a component of the virtual computing system and booting, by the processor, the component into an update environment based on the software package. The software package decouples a dependency of the lifecycle manager on the update environment. The method also includes updating, by the processor, the component in the update environment and booting, by the processor, the component out of the update environment into an operating environment upon completion of the update of the component.

In accordance with some other aspects of the present disclosure, a non-transitory computer readable media having computer-executable instructions stored thereon is disclosed. The instructions when executed by a processor of a lifecycle manager associated with a virtual computing system of a hyperconverged system causes the processor to perform a process. The process includes installing a software package on a node of the virtual computing system for updating a component of the virtual computing system and booting the component into an update environment based on the software package. The software package decouples a dependency of the lifecycle manager on the update environment. The process also includes updating the component in the update environment and booting the component out of the update environment into an operating environment upon completion of the update of the component.

In accordance with yet other aspects of the present disclosure, a system is disclosed. The system includes a memory of a lifecycle manager in a virtual computing system of a hyperconverged system, the memory storing computer-readable instructions and a processor executing the computer-readable instructions to install a software package on a node of the virtual computing system for updating a component of the virtual computing system. The processor also executes the computer-readable instructions to boot the component into an update environment based on the software package, such that the software package decouples a dependency of the lifecycle manager on the update environment, update the component in the update environment, and boot the component out of the update environment into an operating environment upon completion of the update of the component.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to performing updates of a component in a virtual computing system having a plurality of clusters, with each cluster having one or more host machines or nodes. Each node may include one or more virtual machines, with each virtual machine being managed, controlled, and otherwise operated by an instance of a virtual machine monitor (e.g., hypervisor) and a controller/service virtual machine ("CVM"). Proper operation of the various components (e.g., host machines, virtual machines, network devices, storage devices, etc., also collectively referred to herein as "entities") of the virtual computing system may require periodically upgrading those components to provide new features, security fixes, enhance user experience, etc. Updates to a component may involve software updates and/or firmware updates. For example, updates may include operating system updates, virtual machine monitor upgrades, or upgrades to other software associated with the various components of the virtual computing system. The terms "update" and "upgrade" are used interchangeably herein.

To perform an upgrade on a component, that component may be placed in a maintenance mode and booted into a specific update "environment." The update may be performed in that update environment, and upon finishing the update, the component may be booted out of that update environment and removed from maintenance mode. An "update environment" may include various libraries, scripts, binaries, and/or other types of data, including an ISO file image, that may enable updating a component. Example update environments may include Phoenix, IVU (In Virtual Machine Updates), etc. Thus, a component of the virtual computing system may be running in a Phoenix environment, an IVU environment, etc. during updates. In some embodiments, to perform an update, a life cycle manager may be used. In some embodiments, the life cycle manager may perform updates in one or more phases. For example, in a first phase, the life cycle manager may perform a pre-check or pre-upgrade check to ensure that an upgrade is likely to be successful upon completion. For example, the life cycle manager may check for compatibility of a component to ensure that the component is able to upgrade from the existing version before the upgrade to a new version after the upgrade and remain operational with the other elements associated with the component after the upgrade. The life cycle manager may also check for network connectivity, amount of space needed for the update, amount space available, etc.

Upon completing the first phase, the life cycle manager may install the upgrade to the component. In some embodiments, the upgrade may be applied to one node at a time to ensure continuity of operation such that the other nodes continue to operate while one node is being upgraded. The node being upgraded may be allocated an upgrade token. Before the upgrade, virtual machines from the node holding the upgrade token may be migrated out and any input/output requests to the migrated virtual machines may be forwarded to the nodes to which the virtual machines are migrated to. Any virtual machines that are unable to migrate out may be shut down. Upon migrating the virtual machines or shutting down the virtual machines, the node may be upgraded. In some embodiments, the node may be rebooted into a desired upgrade environment (e.g., Phoenix) before the update. When the upgrade is complete, the node is rebooted to implement the update and to move out of the update environment and into the operating environment. The virtual machines may then be migrated back to the node and the virtual machines that were shut down may be restarted to complete the update. When the update is complete, the upgrade token may be released and allocated to a next node that needs to be updated.

In some embodiments, the above process of updating a component is time consuming. For example, in some embodiments, the total time for upgrading each node may be around 20-50 minutes. Further, the above process requires migrating out virtual machines or shutting down virtual machines, and rebooting the node, which may all disrupt operations and cause inconvenience to a user. In some embodiments, updates in the IVU environment (e.g., IVU updates) may be more desirable. Updates in the IVU environment may avoid the need for migrating or shutting down the virtual machines, as well as possibly avoid the need for rebooting the node upon completing the update. IVU updates may be particularly beneficial for firmware updates (e.g., disk upgrades) or any component that is "passed through" to the CVM. A component may be "passed through" to the CVM if that component is owned by or otherwise managed by the CVM. IVU updates may be performed in the CVM itself, as opposed to the node. In some embodiments, a reboot of the CVM may be needed to implement the update. However, a reboot of the node may still be avoided. IVU updates may be much faster than Phoenix updates. For example, in some embodiments, an IVU update may take a total time (e.g., of all the nodes included) of about 10-30 minutes, with about 1-2 minutes for rebooting to and out of IVU. However, to be able to take advantage of the IVU updates, the life cycle manager needs to be configured for IVU updates. The life cycle manager may be tightly coupled with the update environments in which the updates are performed. In other words, to perform an update in a particular update environment, the life cycle manager needs tools, drivers, and images to operate with the particular update environment.

For example, the life cycle manager (e.g., a framework of the life cycle manager) may need to be specifically configured to handle updates in Phoenix. Similarly, the life cycle manager may need to be specifically configured to handle updates in IVU, etc. Thus, if the life cycle manager is not configured to perform updates in the IVU environment, the life cycle manager may first need to be reconfigured to handle an IVU environment before the IVU environment may be used to perform updates. Therefore, each time a new environment is introduced, the life cycle manager may need to be reconfigured with the tools, drivers, images, etc. of that new environment. Such reconfiguration may be inconvenient, costly, time consuming, impractical, and therefore, undesirable.

To avoid the reconfiguration of the life cycle manager, the present disclosure provides technical solutions that decouple the dependency of the life cycle manager upon a particular update environment. For example, the present disclosure provides an environment module with which the life cycle manager communicates. The environment module may be specifically configured to move a component from an existing environment (e.g., CVM, Host, etc.) to an expected environment (e.g., IVU, Phoenix, etc.). When new environments are added, a new environment module may be created for the new environment. Since the life cycle manager communicates with the environment module, no changes to the configuration of the life cycle manager are needed to handle the new environment. The life cycle manager may simply continue to communicate with the environment module as usual. Thus, the environment module may decouple the life cycle manager from its update environment dependencies and modularize the various update environments. By decoupling the dependency of the life cycle manager on the update environments, each time a new update environment is added, the life cycle manager need not be reconfigured. Thus, the life cycle manager does not need the specific tools, drivers, and images to operate with specific update environments so long as the life cycle manager is configured for communicating with the environment module(s) associated with the various update environments.

In some embodiments, an environment module may be configured as a software package having a predefined module name, script, and ISO image(s) that may be needed to move a specific node (or a CVM of a specific node) into a particular environment. The life cycle manager may interact with the environment module to pass the environment name, version, and other credentials to the specific node. The environment module may then boot the node into the environment that the environment module is configured for.

Advantageously, the environment module provides the ability to add new environments without changing or reconfiguring the life cycle manager, and particularly the framework of the life cycle manager. Any fixes or patches to the update environment may be handled by reconfiguring the environment module, as opposed to reconfiguring the life cycle manager. Reconfiguring an environment module may be much simpler and less time consuming than reconfiguring the life cycle manager. In some embodiments, the environment module may be tied to other software modules of the life cycle manager to avoid need for a bulky test matrix. By using the environment module, the life cycle manager is no longer dependent upon the tools, scripts, drivers, etc. of the specific environment images. With the environment modules, by tagging each environment module with a specific version, repeated testing for static modules which are already qualified may be avoided. Further, when a node is decommissioned, the environment module may be used to delete the storage associated with that node. Thus, the environment module provides an easy, convenient, and time effective mechanism to facilitate updates in new environments without requiring reconfiguration of the life cycle manager.

Figure 1:
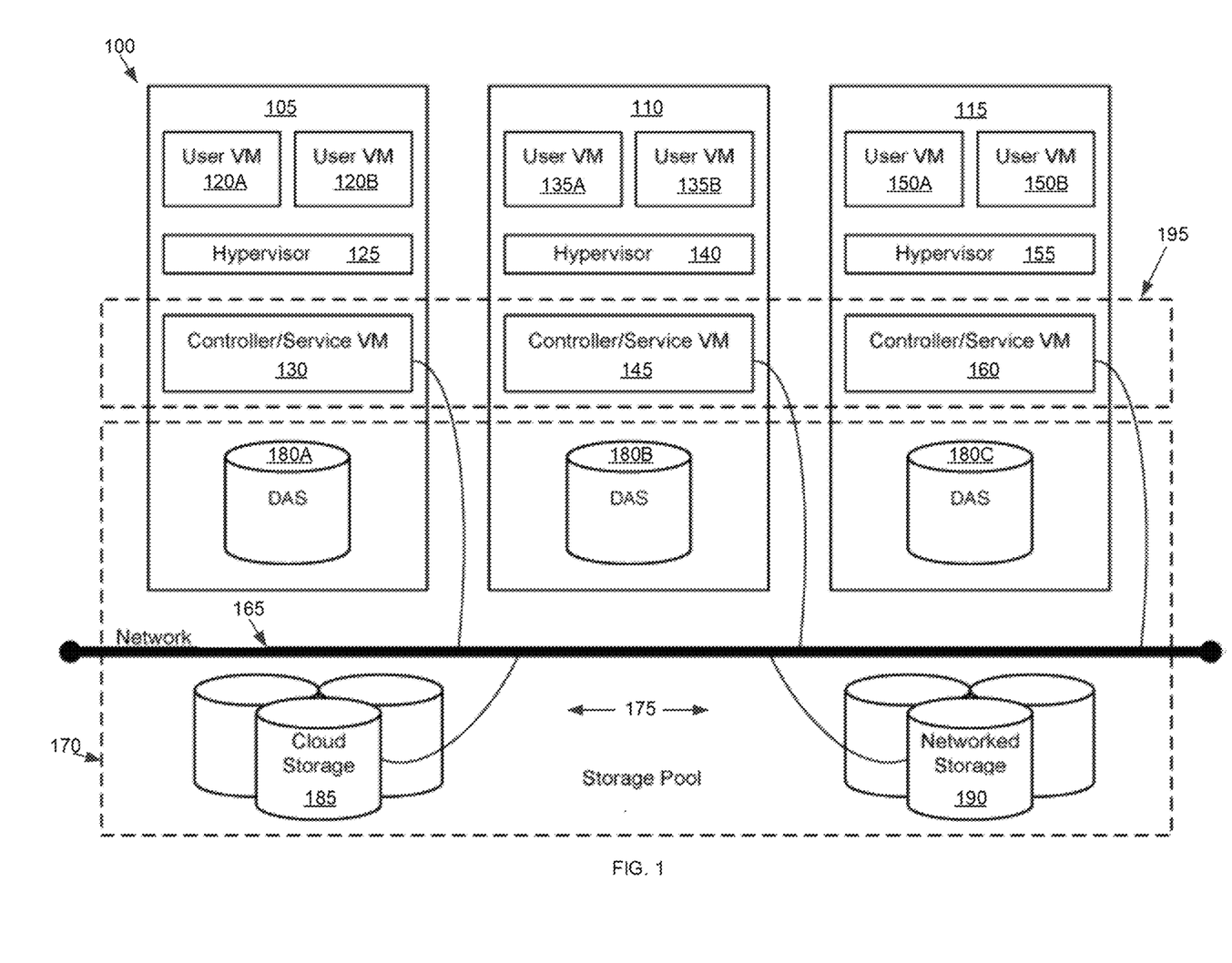
FIG. 1 is an example block diagram of a cluster of a virtual computing system in a hyperconverged system, in accordance with some embodiments of the present disclosure.

Referring now to FIG. 1, a hyperconverged cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the cluster 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The cluster 100 also includes and/or is associated with a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired herein in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. For example, each of the hypervisor 125, the hypervisor 140, and the hypervisor 155 may allocate memory and other resources to the underlying user VMs (e.g., the user VMs 120, the user VMs 135, and the user VMs 150) from the storage pool 170 to perform one or more functions.

By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new user VMs are created (e.g., installed) on the first node 105, the second node 110, and the third node 115, each of the new user VMs may be configured to be associated with certain hardware resources, software resources, storage resources, and other resources within the cluster 100 to allow those virtual VMs to operate as intended.

The user VMs 120, the user VMs 135, the user VMs 150, and any newly created instances of the user VMs are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the cluster 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 is associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
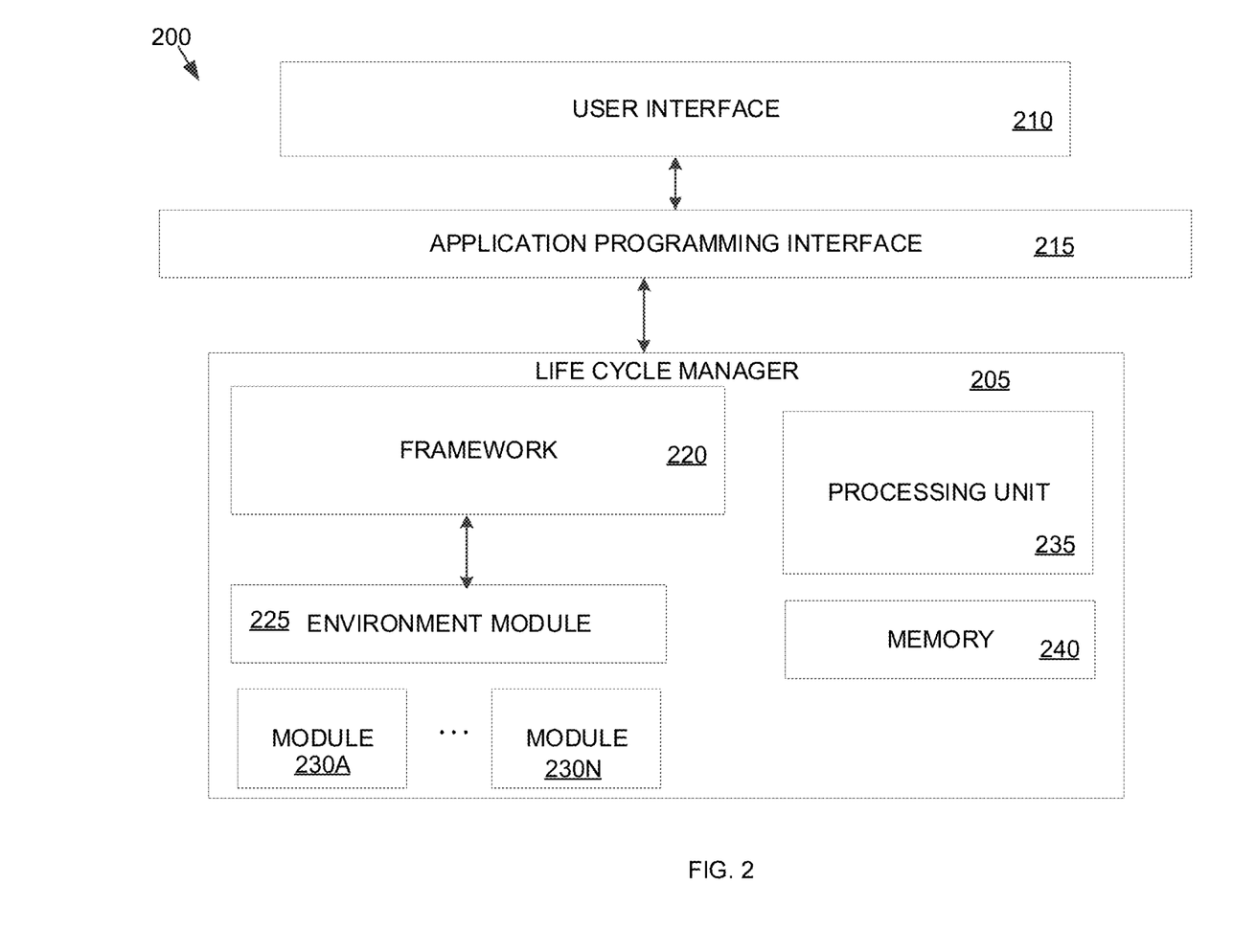
FIG. 2 is an example block diagram of an update system for updating components of the virtual computing system of FIG. 1, in accordance with some embodiments of the present disclosure.

Referring now to FIG. 2, an example block diagram of an update system 200 is shown, in accordance with some embodiments of the present disclosure. The update system 200 may be configured to upgrade components of the virtual computing system 100. For example, the update system 200 may be configured to provide one-click software and firmware upgrades. The update system 200 includes a life cycle manager 205 that tracks software and firmware versions of one or more entities in the virtual computing system 100. In some embodiments, the life cycle manager 205 may be configured to track software and firmware versions across a single cluster, while in other embodiments, the life cycle manager may be configured to track the software and firmware versions across multiple clusters. Based on the tracking, the life cycle manager 205 may decide, in some embodiments, whether a particular component is to be updated, and if so, the life cycle manager may decide when to update that component. In other embodiments, the life cycle manager 205 may receive an indication (e.g., user input) to update a component, and in response to receiving that indication, the life cycle manager may update that component. In some embodiments, the life cycle manager 205 may be configured to facilitate the software and firmware updates of components in a single cluster, while in other embodiments, the life cycle manager may be configured to facilitate software and firmware updates across multiple clusters.

In some embodiments, the life cycle manager 205 may be installed on the leader controller/service VM (e.g., the controller/service VM 130, the controller/service VM 145, or the controller/service VM 160) of a cluster. In other embodiments, the life cycle manager 205 may be installed on one or more other designated controller/service VM(s) (e.g., the controller/service VM 130, the controller/service VM 145, or the controller/service VM 160, respectively). In some embodiments, the life cycle manager 205 may be configured as a software service. In other embodiments, the life cycle manager 205 may be configured as any combination of software, hardware, and/or firmware. The life cycle manager 205 may be configured to communicate with a user through a user interface 210 via an application programming interface ("API") 215. In some embodiments, a user may provide inputs to the life cycle manager 205 for requesting updates to a component of the virtual computing system 100, as well as to receive outputs from the life cycle manager. In some embodiments, the user interface 210 may be accessed through or be a part of a management system or controller that manages/controls all of the nodes (e.g., the first node 105, the second node 110, or the third node 115) of a single cluster. In other embodiments, the user interface 210 may be part of a management system or controller that manages/controls multiples clusters.

The life cycle manager 205 may form the back-end of the update system 200, while the user interface 210 may form the front-end of the update system. The user may, via the user interface 210, instruct the life cycle manager 205 to perform one or more operations. Upon receiving instructions from the user interface 210, the life cycle manager 205 may perform actions consistent with those instructions. Thus, the life cycle manager 205 is not visible to the user, but is rather configured to operate under control of inputs received via the user interface 210, which is visible to and operated by the user. In some embodiments, the life cycle manager 205 may be configured to perform certain operations autonomously without requiring any user input.

In some embodiments, the user interface 210 may be installed on a device associated with the management system described above. In other embodiments, instead of or in addition to being installed on a particular device, the user interface 210 may be hosted on a cloud service and may be accessed via the cloud. In some embodiments, the user interface 210 may additionally or alternatively be configured as a mobile application that is suitable for installing on and access from a mobile computing device (e.g., a mobile phone). Thus, the user interface 210 may be installed in a variety of ways.

Further, the user interface 210 may be configured to access the life cycle manager 205 in a variety of ways. For example, in some embodiments, the user interface 210 may be configured to access the life cycle manager 205 via the API 215. To access the life cycle manager 205 via the API 215, users may access the user interface 210 via designated devices such as laptops, desktops, tablets, mobile devices, other handheld or portable devices, and/or other types of computing devices that are configured to access the API. These devices may be different from the device on which the life cycle manager 205 is installed.

In some embodiments and when the user interface 210 is configured for use via the API 215, the users may access the life cycle manager 205 via a web browser and upon entering a uniform resource locator ("URL") for the API. Using the API 215, the users may then send instructions to the life cycle manager 205 and receive information back from the policy engine. In some embodiments, the API 215 may be a representational state transfer ("REST") type of API. In other embodiments, the API 215 may be any other type of web or other type of API (e.g., ASP.NET) built using any of a variety of technologies, such as Java, .Net, etc., that is capable of accessing the life cycle manager 205 and facilitating communication between the users and the policy engine.

In some embodiments, the API 215 may be configured to facilitate communication between the users via the user interface 210 and the life cycle manager 205 via a hypertext transfer protocol ("HTTP") or hypertext transfer protocol secure ("HTTPS") type request. The API 215 may receive an HTTP/HTTPS request and send an HTTP/HTTPS response back. In other embodiments, the API 215 may be configured to facilitate communication between the user interface 210 and the life cycle manager 205 using other or additional types of communication protocols. In other embodiments, the user interface 210 may be configured to access the life cycle manager 205 in other ways.

Thus, the user interface 210 provides a user interface that facilitates human-computer interaction between the users and the life cycle manager 205. Thus, the user interface 210 is configured to receive user inputs from the users via a graphical user interface ("GUI") of the management system and transmit those user inputs to the life cycle manager 205. The user interface 210 is also configured to receive outputs/information from the life cycle manager 205 and present those outputs/information to the users via the GUI of the management system. The GUI may present a variety of graphical icons, visual indicators, menus, visual widgets, and other indicia to facilitate user interaction. In other embodiments, the user interface 210 may be configured as other types of user interfaces, including for example, text-based user interfaces and other man-machine interfaces. Thus, the user interface 210 may be configured in a variety of ways.

Further, the user interface 210 may be configured to receive user inputs in a variety of ways. For example, the user interface 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to send information to the life cycle manager 205. The user interface 210 may also be configured to present outputs/information to the users in a variety of ways. For example, the user interface 210 may be configured to present information to external systems such as users, memory, printers, speakers, etc.

Therefore, although not shown, the user interface 210 may be associated with a variety of hardware, software, firmware components, or combinations thereof. Generally speaking, the user interface 210 may be associated with any type of hardware, software, and/or firmware component that enables the life cycle manager 205 to perform the functions described herein.

Referring still to FIG. 2, the life cycle manager 205 includes a framework 220 and an environment module 225. The life cycle manager 205 may also include one or more other software modules 230A-230N (collectively "software modules 230") that may be configured to perform inventory and various update operations. Although the framework 220, the environment module 225, and the modules 230 are shown as separate components, in some embodiments, one or more of these components may be integrated together, and the integrated component may perform the functions of the separate components, as disclosed herein. The framework 220 may be configured as a download manager for the environment module 225 and the modules 230—for validating and downloading module content from a module (e.g., the environment module). The framework 220 may act as an intermediary between a component being updated and a module (e.g., the environment module 225, the modules 230) of the life cycle manager 205. Each of the modules 230 and the environment module 225 may include libraries, images, metadata, checksums for security, and other information for updating a component of the virtual computing system 100.

In some embodiments, before performing an update, the life cycle manager 205 may be configured to take an inventory of the components on a cluster. For example, to take inventory, the life cycle manager 205, and particularly, the framework 205 may be configured to identify and/or display what software and firmware various entities in a cluster contain. In some embodiments, the inventory may be taken on a node when the node comes online for the first time. In other embodiments, the inventory may be taken periodically. In some embodiments, the life cycle manager 205 may take inventory autonomously without any user input. In some embodiments, the life cycle manager 205 may receive a user input to take inventory, and the life cycle manager may take inventory in response to the user input. The inventory may be displayed on the user interface 210. In some embodiments, the inventory may be taken by one of the modules 230 upon direction by the framework 220.

To perform an update (e.g., a firmware update) on a component of the virtual computing system 100, the life cycle manager 205 may utilize the environment module 225. In some embodiments, the environment module 225 may be used to prepare and setup an update environment that is suitable for performing an update. For example, in some embodiments, the environment module 225 may be used to setup an IVU (In VM Update) update environment. In other embodiments, the environment module 225 may be used to setup a different update environment for updating a component. The environment module 225 may be particularly beneficial when using new environments that the life cycle manager 205 is not specifically configured to handle. For example, as discussed above, the life cycle manager 205 is configured to perform updates in different environments (e.g., CVM, Host, Phoenix, etc.). To perform an update, the life cycle manager 205 puts the updating component in a maintenance mode and boots that component in a desired update environment. The life cycle manager 205 then updates the component in the desired update environment and boots the component out of the desired environment. However, since the life cycle manager 205 is only designed to handle certain preconfigured environments, when a new environment is added, the life cycle manager needs to be reconfigured. The environmental module 225 avoids such reconfiguration of the life cycle manager 205 to add new environments, thereby modularizing the update environment and decoupling the dependency of the life cycle manager on the update environment. When a new update environment is to be added, instead of reconfiguring the life cycle manager 205 by adding new tools, drivers, and images to operate with the new update environment, a new instance of the environment module 225 for the new desired update environment may be added. The new instance of the environment module 225 avoids the need to reconfigure the tools, drivers, and images of the life cycle manager 205 to operate with the new update environment, thereby decoupling the dependency of the life cycle manager on the new update environment. Thus, in some embodiments, the life cycle manager 205 may be associated with multiple environment modules, with each environment module configured for a particular update environment, without needing the life cycle manager to be specifically configured for operating with the update environments.

In some embodiments, the environment module 225 is a software package having programmed instructions stored on a memory. The programmed instructions may be executed by a processing unit of the life cycle manager 205. In some embodiments, the environment module 225 may include a Java Script Object Notation ("json") structure having meta information, including dependencies on library modules. The json structure may also include various action types associated with the environment that the environment module 225 is configured for. The environment module 225 may also include a python file to perform one or more pre and post actions, as discussed below. In other embodiments, the environment module 225 may be configured in other ways. In some embodiments, the environment module 225 may include binaries and scripts. For example, in some embodiments, the environment module 225 may include tar.gz files containing a json file and a python module. An internal structure of the environment module 225 may, in some embodiments, be represented as:

```
manifest.json
__init__.py
<other python files>
<other binaries/iso files>
```

In some embodiments, the json file of the environment module 225 may be the manifest.json file. The manifest.json file may have the following structure:

```
{
"module_type": "environment"
"file_name": <name of the file>,
"url": <url to image> # optional, points to an external source if provided
"resolve": <boolean> # optional, tells build to download the file if provided and true
"env_name": <string> # environment module name e.g IVU, Phoenix etc.
"version": <sting> # current version of the environment module.
"library_modules": [<reference_name>, <reference_name>],
}
```

The "module_type" in the manifest.json file may be "environment" to distinguish the environment module 225 from other types of software modules (e.g., the software modules 230) of the life cycle manager 205. The "env_name" may be the environment type (e.g., IVU, Phoenix, etc.) that enables the framework 220 to search for and implement the environment module for an update. The "file_name" may be the name assigned to the environment module 220. The "library_modules" define the list of names of the software modules 230 that the environment module 225 depends upon. "Version" may define the current version of the environment module 225. When the environment module 225 is updated, a new "version" of the environment module may be created. Thus, in some embodiments, there may be multiple instances (e.g., different versions) of the environment module 225 for the same environment.

An example of a manifest.json file for the environment module 225 may be as follows:

```
{
"file_name":"phoenix-ivu-v1.0.0.tgz",
"url": "ENV_URL/IVU/",
"sha256sum": "24b787e4c2241f8903f5af3e99935b2eea11e45228739df96022f4eb7cc0717f",
"module_type": "environment",
"action": "reboot_to_ivu",
"version": "1.0"
}
```

It is to be understood that the above example is not intended to be limiting in any way. The python structure of the environment module 225 may include the "_init_.py" file mentioned above. In some embodiments, the python file may include the following interfaces:

def pre_actions (*args, **kwargs): to define pre-actions that are performed before the update. Pre-actions may include downloading, staging, and setting up the environment module 225 for performing an update. The return value may be a status and error string (e.g., (Status, Error_String)). Status may be "true" in case of success of a pre-action and "false" in case of failure of the pre-action. Error_String may include a string if there is an error. Otherwise, the Error_String may be empty.

def post_actions (*args, **kwargs): to define post-actions that are performed when the update is complete. Once the update is completed, this function performs the post-actions for the environment module 225 to move the node/CVM out of the staging (e.g., update) environment (e.g., IVU). The return value may be status and error string (e.g., (Status, Error_String)). Status may be "true" in case of success of a post-action and "false" in case of failure of the post-action. Error_String may be a string if there is an error. Otherwise, the Error_String may be empty.

def get_env_name (*args, **kwargs): to return the name of the environment that is supported by the environment module 225. The return value may be status and error string (e.g., (Status, Error_String)). Status may be "true" in case of success of retuning the environment and "false" in case of failure of returning the environment. Error_String may be a string if there is an error. Otherwise, the Error_String may be empty.

def get_version (*args, kwargs): to return the version of the environment module 225**. The return value may be status and error string (e.g., (Status, Error_String)). Status may be "true" in case of success of retuning the version and "false" in case of failure of returning the version. Error_String may be a string if there is an error. Otherwise, the Error_String may be empty.

Thus, the environment module 225 may include images/library modules. The environment module 225, in some embodiments, may have dependencies on other software modules (e.g., the software modules 230). In some embodiments, the environment module 225 may be downloaded and staged (e.g., installed) on the leader controller/service VM by the framework 220 of the life cycle manager 205. In some embodiments, the environment module 225 may be downloaded after inventory has been taken and when an update is ready to be performed (e.g., when the pre-actions are to be performed). In some embodiments, the environment module 225 may be defined for specific actions to be performed by the framework 220 and may be used when those actions are to be performed. In some embodiments, the environment module 225 may include details for the action type, such that the framework 220 may map the environment module to the specific action. In other words, in some embodiments, the environment module 225 may define two specific flags (e.g., action_type, version) in the manifest.json file. The actions of the environment module 225 may be idempotent in nature. In some embodiments, the environment module 225 may include the following functions: pre_actions, post_actions, get_version, get_action, verify_pre_action, and verify_post_action. In other embodiments, the environment module 225 may be configured with other or additional features and/or functions.

Further, the life cycle manager 205, and particularly the framework 220 and/or the environment module 225 may be configured as, and/or operate in association with, hardware, software, firmware, or a combination thereof. Specifically, the life cycle manager 205 may include a processing unit or processor 235 configured to execute instructions for implementing the functionalities of the life cycle manager 205. In some embodiments, each of the framework 220 and the environment module 225 may have their own separate instance of the processing unit 235. The processing unit 235 may be implemented in hardware, firmware, software, or any combination thereof. "Executing an instruction" means that the processing unit 235 performs the operations called for by that instruction.

The processing unit 235 may retrieve a set of instructions from a memory for execution. For example, in some embodiments, the processing unit 235 may retrieve the instructions from a permanent memory device like a read only memory (ROM) device and copy the instructions in an executable form to a temporary memory device that is generally some form of random access memory (RAM). The ROM and RAM may both be part of a memory 240, which in turn may be provisioned from the storage pool 170 of FIG. 1 in some embodiments. In other embodiments, the memory 240 may be separate from the storage pool 170 or only portions of the memory 240 may be provisioned from the storage pool. In some embodiments, the memory in which the instructions are stored may be separately provisioned from the storage pool 170 and/or the memory 240. The processing unit 235 may be a special purpose computer, and include logic circuits, hardware circuits, etc. to carry out those instructions. The processing unit 2305 may include a single stand-alone processing unit, or a plurality of processing units that use the same or different processing technology. The instructions may be written using one or more programming language, scripting language, assembly language, etc.

Figure 3:
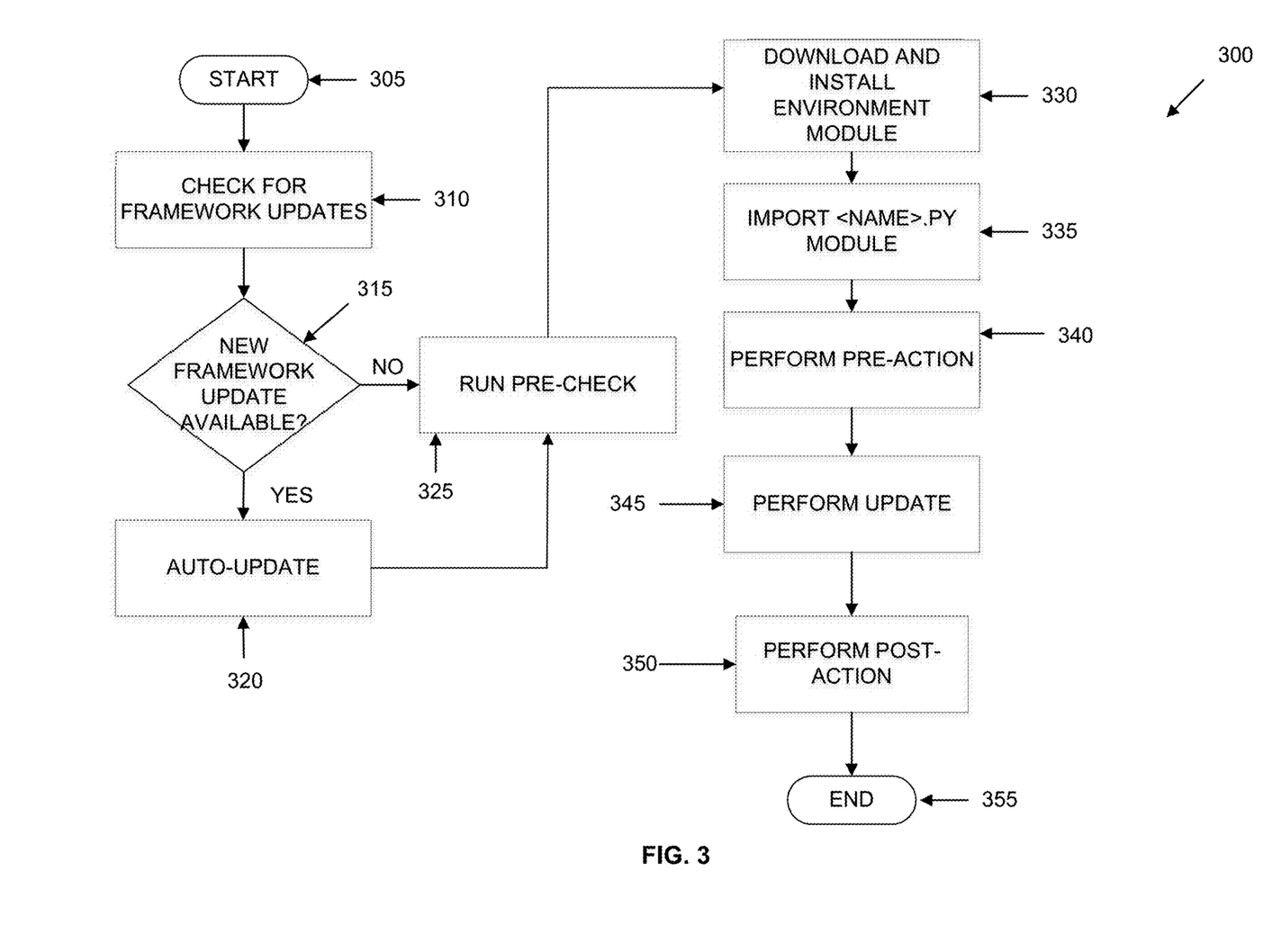
FIG. 3 is an example flowchart outlining operations for updating a component of the virtual computing system of FIG. 1 using the update system of FIG. 2, in accordance with some embodiments of the present disclosure.

Turning now to FIG. 3, an example flow chart outlining operations of a process 300 are shown, in accordance with some embodiments of the present disclosure. The process 300 may include additional, fewer, or different operations, depending on the particular embodiment. The process 300 is discussed in conjunction with FIG. 2 and is implemented by the life cycle manager 205, and particularly the framework 220 of the life cycle manager. The process 300 starts at operation 305 when an update (e.g., firmware update) to a component is desired. In some embodiments, the framework 220 may receive a user input requesting an update to a particular component (e.g., an entity owned by a controller/service VM). In other embodiments and based on programmed instructions, the framework 220 may decide autonomously that an upgrade to a component is available and that the component is to be updated. In some embodiments and based on programmed instructions, the framework 220 may also decide when to update the component.

At operations 310 and 315, the life cycle manager 205 and particularly the framework 220 may analyze itself to determine whether the framework is fully updated or if a new update is available to be applied to the framework. If a new update is available to be applied to the framework, at operation 320, the framework automatically updates itself. Upon updating itself or if no updates are necessary to the framework 220, the process 300 proceeds to operation 325. At the operation 325, the framework 220 performs one or more pre-checks before performing the update. For example, in some embodiments, as part of the pre-check, the framework 220 may verify that the update is compatible with existing elements associated with the component being updated. In some embodiments, the framework 220 may verify that the cluster, node, or component being updated is healthy and not already in a maintenance state. In some embodiments, the framework 220 may also determine if there is enough available memory space for the update. In some embodiments, the framework 220 may test network connectivity. In other embodiments, the framework 220 may perform other or additional pre-checks. Generally speaking, the framework 220 may be configured to perform any pre-check that may be needed or considered desirable in ensuring that the update is successful and that after the update, the component is able to continue normal operation without failure.

Upon completing pre-checks, the framework 220 may download and install the environment module 225 at operation 330. In some embodiments, the framework 220 may perform the operation 330 before the operation 225. In other words, the framework 220 may download and install the environment module 225 before performing the pre-checks. To download and install the environment module 225, the framework 220 may first search for the appropriate environment module from a list of all available environment modules. In some embodiments, the framework 220 may search for the appropriate environment module using the "env_name" field in the manifest.json file of the environment module. If the framework 220 determines that there are multiple environment modules with the same "env_name," in some embodiments, the framework may apply further filters that may be pre-programmed within the framework to identify the appropriate environment module. In some embodiments, the framework 220 may look for an environment module that is configured for pre-actions. Upon finding the appropriate environment module, the framework 220 may download the environment module 225 on to the leader controller/service VM of the cluster associated with the component being updated. In addition to downloading, in some embodiments, the framework 220 may need to perform other operations to be able to use the environment module for updating the component. In some embodiments, the framework 220 may need to extract the environment module 225 (e.g., from a zip file, etc.) upon downloading and import the python file (e.g., setup_env.py module) at operation 335. Upon downloading and installing the environment module 225 on the leader controller/service VM, the framework 220 may use the environment module to perform one or more validation functions on an available action type by calling a get_action_name( ) function.

Specifically, at operation 340, the framework 220 may perform one or more pre-actions by calling a pre-action( ) function. By way of the pre-action function, the framework 220 may boot the component into an update environment (e.g., IVU). The framework 220 may also verify that the component has been booted into the update environment successfully. The framework 220 may perform other pre-actions that may be desired or considered necessary. Upon performing the pre-actions, in some embodiments, the framework 220 may delete the environment module and associated files from the leader CVM. The framework 220 also updates the component at operation 345 and at operation 350, the framework performs one or more post-actions. In some embodiments, different environment modules may be used for pre-action and post-action. In other embodiments, the same environment module may be configured for both pre-actions and post-actions. In such embodiments, the environment module need not be deleted upon performing the pre-actions.

If a different environment module is used for post-actions, at the operation 350, the environment module associated with the post-actions may be downloaded and installed, as discussed above. The framework 220 may call a get_action and get_version function for validating the environment module 225. Upon validating, the framework 220 may make one or more post_action function calls to perform one or more post-actions. In some embodiments, a post-action may include booting the component out of the update environment (e.g., IVU). The framework 220 may verify that the component has been booted out of the update environment and that the update was successful. Upon successfully updating the component, the framework 220 may delete the environment module 225 and the process ends at operation 355. If the framework 220 determines that the update was not successful, the framework may issue an error message, boot the component out of the update environment, and/or wait for the error to be resolved to try the update again.

An example of the pre-actions and post-actions performed by the environment module 225 may be as follows:

```
"boot_into_ivu" : {
"PreActions": [
    ("get_shutdown_token", "getting shutdown token", 1),
        ("forward_storage_traffic", "forwarding storage traffic", 2),
        ("enter_cvm_mm", "entering CVM into maintenance mode", 4),
        ("wait_for_services_shutdown",
        "waiting for all services to shutdown on CVM", 2),
        ("reboot_to_ivu", "re-booting from CVM to ivu iso", 5),
],
"PostActions": [
            ("reboot_from_ivu", "re-booting from ivu to CVM", 5),
            ("exit_cvm_mm", "exiting CVM from maintenance mode", 4),
            ("wait_for_services_startup",
            "waiting for all services to startup on CVM", 2),
            ("retain_storage_traffic", "retaining storage traffic", 2),
    ],
        "description": (
            "To apply these updates, each CVM boots into a predefined ISO"
            "Given by the environment module, each environment module to specify"
            "the action type and corresponding module to be downloaded to"
            "Perform the action"
        )
}
```

It is to be understood that any examples used herein are simply for purposes of explanation and are not intended to be limiting in any way. It is also to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    installing, by a processor executing computer-readable instructions stored on a memory, a pre-defined software package in a virtual computing system for updating a component of the virtual computing system in an update environment;
    booting, by the processor, the component into the update environment using the pre-defined software package, wherein the pre-defined software package allows the processor to communicate with a plurality of update environments without needing to reconfigure the processor for communication with each of the plurality of update environments;
    updating, by the processor, the component in the update environment; and
    booting, by the processor, the component out of the update environment into an operating environment upon completing the updating of the component.

2. The method of claim 1, further comprising performing, by the processor, a pre-check on the component before updating.

3. The method of claim 2, wherein the pre-check comprises at least one of checking compatibility of an update being performed on the component with one or more other elements associated with the component, verifying a health of the component, verifying that the component is not already in a maintenance mode, checking availability of memory space for the update, or checking network connectivity.

4. The method of claim 1, wherein the pre-defined software package comprises a name, a script, and an image.

5. The method of claim 1, wherein the pre-defined software package is configured for communication with each of the plurality of update environments, and wherein the processor communicates with each of the plurality of update environments via the pre-defined software package.

6. The method of claim 1, wherein the pre-defined software package comprises a Java Script Object Notation (JSON) structure.

7. The method of claim 1, wherein the pre-defined software package is configured to perform at least one of a pre-action to be performed before the updating of the component or a post-action to be performed after the updating of the component.

8. The method of claim 1, wherein the update environment is an In Virtual Machine Update environment.

9. The method of claim 1, further comprising deleting, by the processor, the pre-defined software package after the updating of the component.

10. A non-transitory computer-readable media comprising computer-readable instructions stored thereon that when executed by a processor of a lifecycle manager configured to update components in a virtual computing system cause the processor to:
    receive a request to update a component of the virtual computing system;
    deploy and run a pre-defined software package to boot the component into an update environment where updates are performed, wherein the pre-defined software package comprises one or more scripts that allow the processor to communicate with a plurality of update environments to update the component in the update environment without needing to reconfigure the processor for communication with each of the plurality of update environments, and wherein the pre-defined software package boots the component into the update environment; and updating the component in the update environment, wherein the pre-defined software package is configured to boot the component into an operating environment from the update environment after the update.

11. The non-transitory computer-readable media of claim 10, wherein the processor further executes computer-readable instructions for updating of the component without rebooting an underlying node of the component.

12. The non-transitory computer-readable media of claim 10, wherein the processor further executes computer-readable instructions for updating of the component without migrating a virtual machine from an underlying node of the component to another node.

13. The non-transitory computer-readable media of claim 10, wherein the pre-defined software package further comprises a name and an image.

14. A system comprising:
a memory storing computer-readable instructions thereon; and
a processor executing the computer-readable instructions to:
receive a request to update a component of a virtual computing system;
deploy and run a pre-defined software package to boot the component into an update environment where updates are performed, wherein the pre-defined software package comprises one or more scripts that allow the processor to communicate with a plurality of update environments to update the component in the update environment without needing to reconfigure the processor for communication with each of the plurality of update environments, and wherein the pre-defined software package boots the component into the update environment; and
update the component in the update environment, wherein the pre-defined software package is configured to boot the component into an operating environment from the update environment after the update.

15. The system of claim 14, wherein the pre-defined software package further comprises a name and an image.

16. A method comprising:
receiving, by a processor executing computer-readable instructions stored on a memory, a request to update a component of the virtual computing system;
deploy and run a pre-defined software package to boot the component into an update environment where updates are performed, wherein the pre-defined software package comprises one or more scripts that allow the processor to communicate with a plurality of update environments to update the component in the update environment without needing to reconfigure the processor for communication with each of the plurality of update environments, and wherein the pre-defined software package boots the component into the update environment; and
updating the component in the update environment, wherein the pre-defined software package is configured to boot the component into an operating environment from the update environment after the update.

17. The method of claim 16, further comprising updating of the component without rebooting an underlying node of the component.

18. The method of claim 16, further comprising updating of the component without migrating a virtual machine from an underlying node of the component to another node.

19. A non-transitory computer-readable media comprising computer-readable instructions stored thereon that when executed by a processor of a lifecycle manager configured to update components in a virtual computing system cause the processor to:
install a pre-defined software package in a virtual computing system for updating a component of the virtual computing system in an update environment;
boot the component into the update environment using the pre-defined software package, wherein the pre-defined software package allows the processor to communicate with a plurality of update environments without needing to reconfigure the processor for communication with each of the plurality of update environments;
update the component in the update environment; and
boot the component out of the update environment into an operating environment upon completing the updating of the component.

20. The non-transitory computer-readable media of claim 19, wherein the processor further executes computer-readable instructions for performing a pre-check on the component before updating.

21. The non-transitory computer-readable media of claim 20, wherein the pre-check comprises at least one of checking compatibility of an update being performed on the component with one or more other elements associated with the component, verifying a health of the component, verifying that the component is not already in a maintenance mode, checking availability of memory space for the update, or checking network connectivity.

22. The non-transitory computer-readable media of claim 19, wherein the pre-defined software package comprises a name, a script, and an image.

23. The non-transitory computer-readable media of claim 19, wherein the pre-defined software package is configured for communication with each of the plurality of update environments, and wherein the processor communicates with each of the plurality of update environments via the pre-defined software package.

24. A system comprising:
a memory storing computer-readable instructions thereon; and
a processor executing the computer-readable instructions to:
install a pre-defined software package in a virtual computing system for updating a component of the virtual computing system in an update environment;
boot the component into the update environment using the pre-defined software package, wherein the pre-defined software package allows the processor to communicate with a plurality of update environments without needing to reconfigure the processor for communication with each of the plurality of update environments;
update the component in the update environment; and
boot the component out of the update environment into an operating environment upon completing the updating of the component.

25. The system of claim 24, wherein the processor further executes computer-readable instructions for performing a pre-check on the component before updating.

26. The system of claim 25, wherein the pre-check comprises at least one of checking compatibility of an update being performed on the component with one or more other elements associated with the component, verifying a health of the component, verifying that the component is not already in a maintenance mode, checking availability of memory space for the update, or checking network connectivity.

27. The system of claim 24, wherein the pre-defined software package comprises a name, a script, and an image.

28. The system of claim 24, wherein the pre-defined software package is configured for communication with each of the plurality of update environments, and wherein the processor communicates with each of the plurality of update environments via the pre-defined software package.

\* \* \* \* \*